May 21, 1957 O. L. PATTERSON ET AL 2,793,320

MEMORY TUBE FUNCTION GENERATOR

Filed July 30, 1951 4 Sheets-Sheet 1

INVENTORS.
OMAR L. PATTERSON &
EDWARD W. YETTER
BY Busser & Harding
ATTORNEYS.

MEMORY TUBE FUNCTION GENERATOR

Filed July 30, 1951

INVENTORS.
OMAR L. PATTERSON &
EDWARD W. YETTER
BY Busser & Harding
ATTORNEYS.

INVENTORS.
OMAR L. PATTERSON &
EDWARD W. YETTER
BY Busser & Harding
ATTORNEYS.

MEMORY TUBE FUNCTION GENERATOR

Filed July 30, 1951 4 Sheets-Sheet 4

INVENTOR.
OMAR L. PATTERSON &
EDWARD W. YETTER
BY Busser & Harding
ATTORNEYS.

2,793,320

MEMORY TUBE FUNCTION GENERATOR

Omar L. Patterson, Media, and Edward W. Yetter, Philadelphia, Pa., assignors to Sun Oil Company, Philadelphia, Pa., a corporation of New Jersey Application July 30, 1951, Serial No. 239,278

14 Claims. (Cl. 315—24)

This invention relates to method and means for producing a cyclically repetitive arbitrary waveform as a function of time or a potential and to apparatus involving said waveform producing means though, as will appear hereafter, the invention is also adapted to provide an output which is a predetermined function of a potential without involvement of cyclical repetition. In particular, the invention relates to the use of a memory tube for this purpose involving a minimum of complexity of apparatus and high accuracy independent to a high degree of the characteristics of said tube. The type of tube involved in the present invention has been described in the literature and reference may be particularly made to the article entitled "A memory tube," by Haeff, in Electronics of September 1947, and an article entitled "Barrier grid storage tube and its operation," by Jenson, Smith, Messner and Florie, in the RCA Review of March 1948.

Memory tubes of the type described have generally been proposed for such uses as the retention of two dimensional television or radar images or for purposes of storage of digital information for computers or the like. For such applications, the reading out of information from the tube has generally been effected by zig-zag scanning of television type. In these uses an arbitrary waveform may, of course, be recorded in the tube as a curve in rectangular coordinates; but the method of scanning normally used for reproduction of this curve will, in general, not be of a fashion permitting the function to be read out as a continuously varying potential which is a function of time or potential in the same sense in which the recorded curve is a function of an abscissa.

It is an object of the present invention to provide for the recording in a memory tube of the type indicated of a function with provision for regeneration of the function from the memory tube. In particular, the present invention relates to the accurate regeneration of the recorded function to a degree substantially independent of non-linearity in deflection sensitivity of the tube and of aberrations of the tube's electron optical system. The desired results are secured by both writing and reading of the function by the same read-write gun so that potentials which will direct the electron beam to a particular point of the target will be substantially identical with those potentials which will exist when the record at that point is read out. In accomplishing this end the writing beam is caused to be deflected by potentials which are related to the abscissae and ordinates of the curves to be recorded and in the reproduction of the function the reading beam is caused to follow closely the recorded curve representative of the function. In one modification of the invention which will be described there is departure from this last method of reading but in common with other modifications there is substantial independence of tube characteristics with the resulting highly accurate reproduction of the recorded function.

If a linear time sweep is used for both recording and reproduction, it will be evident that the reproduced function will correspond to the original and will be a function of time. However, alternatively, the record may be produced by a linear time sweep and then for reproduction there may be used a sweep function which is a nonlinear function of time. In such case, it will be evident that the generated function will be a function not of time but of the sweep function which is, in turn, a function of time. Thus it will be evident that various complex functions may be generated.

As will appear hereafter, the original trace which is recorded may be manually drawn. However, the record may also be made, if desired, by applying a particular electrical waveform of either repetitive or transient type to the memory tube whereupon, if desired, the wave may be measured on a plotting board. The functional relationships of two waves may also be ascertained in similar fashion.

Furthermore, as will become apparent, one or more generators of the type indicated may be used to provide input functions for differential analyzers or other computing apparatus.

Further objects of the invention relate to improved methods and apparatus for the following of a recorded trace by the focused spot of the reading gun.

The various general objects of the invention relate to the attainment of the results indicated above. These and other objects of the invention particularly relating to details of construction and operation will become apparent from the following description read in conjunction with the accompanying drawings, in which.

Figure 1:
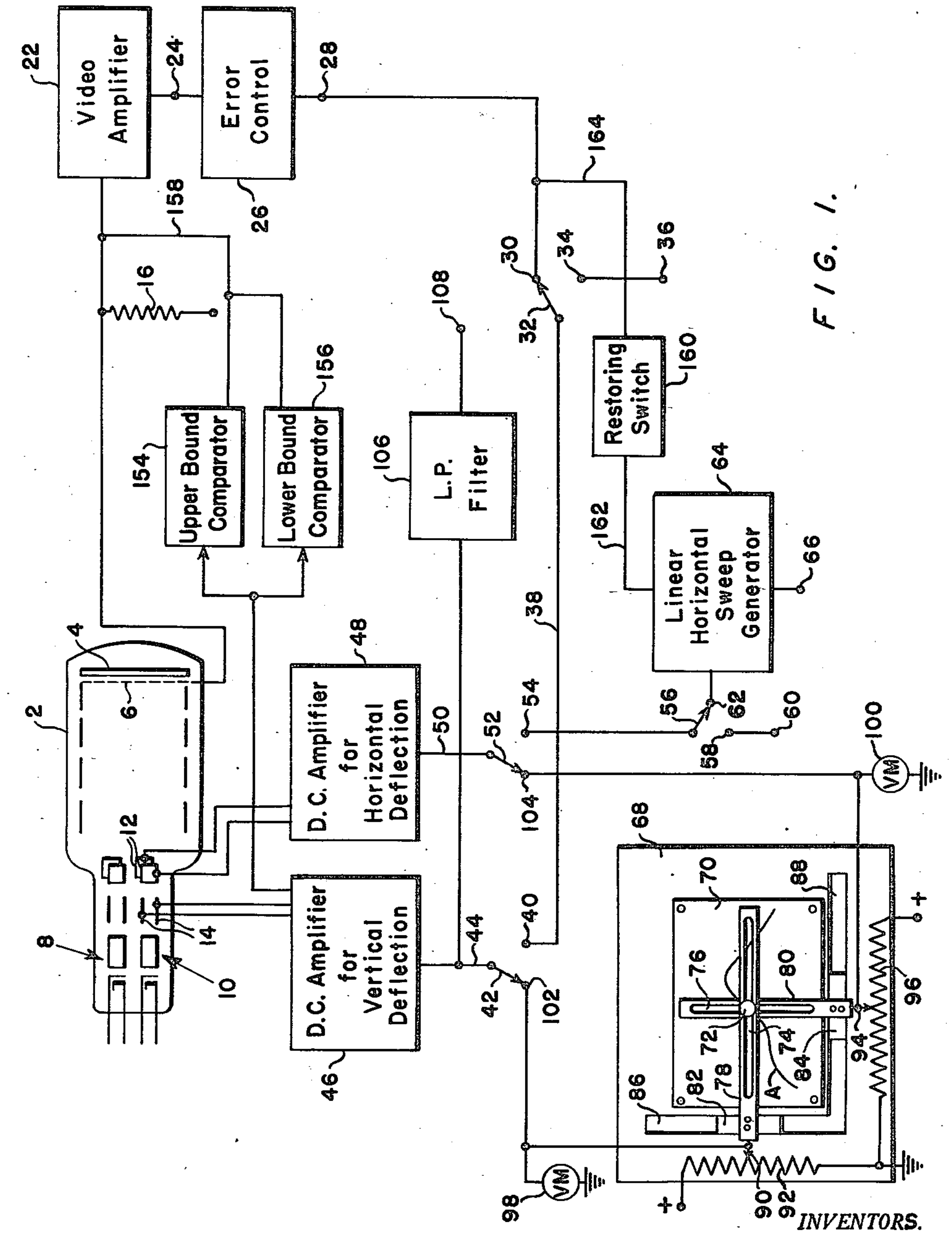
Figure 1 is a diagram indicating one form of the improved function generator.

Referring to Figure 1, there is indicated at 2 a memory tube of the type referred to above having a target 4 and a collector screen 6 associated with a pair of guns 8 and 10 of which the former is a conventional holding gun while the latter is used for both reading and writing. In tubes of this type there are sometimes provided separate guns for the reading and writing functions. However, it will be evident that it is practically impossible to give such guns identical deflection characteristics or to make them identical from the optical standpoint. Since one of the major objects of the present invention is to secure high accuracy of reproduction of a function represented by a record on the target, it is very desirable to provide a single gun for both reading and writing since these functions will always be carried out at different times. As a result of using a single gun it will be evident that any optical aberrations or any particular deflection characteristics are completely eliminated from the standpoint of effect on accuracy of the results.

The horizontal deflecting plates of the read-write gun are indicated at 12 and the vertical deflecting plates of this gun are indicated at 14. It will be understood that the memory tube includes the usual and conventional elements for control of its operation and these need not be described; nor need there be described the various connections supplying power to the elements of the tube, these being entirely conventional. It will be evident that sharp focusing of the electron beam on the target is necessary for both writing and reading to secure accurate reproduction of the recorded function.

The output from the collector screen 6 is taken from its load resistor 16 and delivered to a conventional video amplifier 22 which provides its output at terminal 24 to an error control 26 which will be hereafter more fully described with reference to Figure 2. The output terminal 28 of the error control is connected to the contact point 30 of a single-pole double-throw switch 32, the other contact point 34 of which is connected to a terminal 36 for the application of an external arbitrary voltage. The switch 32 is connected through line 38 to the contact point 40 of a single-pole double-throw switch 42 which is connected through line 44 to the direct current amplifier 46 for vertical deflection of the read-write beam of the memory tube. A similar direct current amplifier 48 is provided for horizontal deflection of the beam and receives its input through connection 50 from a single-pole double-throw switch 52, the contact 54 of which is connected through switch 56 alternatively to contact point 58 and terminal 60 for the application of any desired horizontal sweep or variable or adjusted potential or to the contact point 62 which is connected to the conventional linear horizontal sweep generator 64 having a synchronizing connection 66 for the reception of a synchronizing signal.

The video amplifier 22, the amplifiers 46 and 48 and the linear horizontal sweep generator 64 may be conventional and are accordingly not described in detail.

For the purpose of providing vertical and horizontal deflection for the tracing of a curve on the target 14 there is provided the manually operable arrangement shown at the lower left of Figure 1.

A board 68 provides a support for a sheet 70 on which there may be traced and followed a curve A corresponding to the waveform to be generated. A stylus 72 adapted to be moved to follow the curve A has sliding mounting in the slots 74 and 76 of members 78 and 80 provided with crossheads 82 and 84 mounted to slide in rectangular directions in guideways 86 and 88 in the board. The crosshead 82 carries the contact 90 of a linear potentiometer 92 connected between a positive potential source and ground. Similarly the crosshead 84 carries a contact 94 of a linear potentiometer 96 also connected between a positive voltage supply and ground. It will be evident that the arrangement just described provides, when the stylus 72 follows a curve such as A, potentials at contacts 90 and 94 which are linearly related respectively to the ordinates and abscissae of curve A. Suitable voltmeters 98 and 100 may be provided to indicate these potentials. The contact 90 is connected to the contact point 102 of the switch 42 heretofore described while the contact 94 is connected to the contact point 104 of the switch 52 also heretofore described.

The connection 44 is joined to the input of a low pass filter 106 which has a cut-off higher than the maximum frequency component of the output waveform, the output terminal of this filter being indicated at 108. As will appear hereafter the output at connection 44 is in the form of the wave to be reproduced having superimposed thereon a high frequency saw tooth waveform which is filtered out by the filter 106, leaving the waveform desired.

Figure 2:
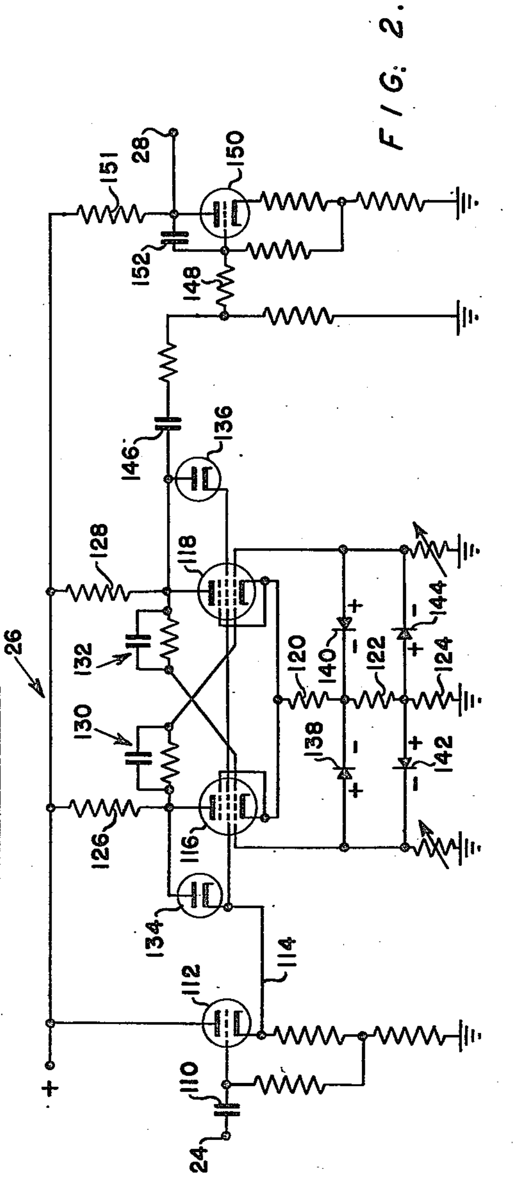
Figure 2 is a wiring diagram showing the details of the error control portion of the apparatus indicated in Figure 1.

The error control 26 is detailed in Figure 2. The input from terminal 24 is delivered through condenser 110 to a cathode follower arrangement comprising the triode 112 and a suitable cathode resistance which, in turn, provides an output through connection 114 to the bistable multivibrator comprising the pentodes 116 and 118. The circuit of this bistable multivibrator or scaling circuit is substantially conventional except for certain limiting arrangements which appear therein. The cathodes of pentodes 116 and 118 are connected together and to ground through a series of resistances 120, 122 and 124. As is usual an essentially constant current flows through these resistances. The anodes of the pentodes are respectively connected to the positive potential supply line through resistances 126 and 128 and criss-cross connections between each anode and the grid of the companion tube are provided by the resistance-capacitance networks indicated at 130 and 132. Connection 114 is to the screens of the pentodes 116 and 118. Diodes 134 and 136 arranged as illustrated are connected between the screens and the anodes of the pentodes. In order to provide voltage limitation there are connected between the grids of the pentodes and the junction points of the resistances 120, 122 and 124 the crystal diodes 138, 140, 142 and 144 polarized as indicated. The result is that the potential of a control grid cannot rise above the potential of the junction point of resistances 120 and 122 and cannot fall below the potential of the junction point of the resistances 122 and 124. In this fashion limited, substantially square waves are emitted when the bistable multivibrator is thrown from its one stable condition to the other. A negative pulse on the line 114 serves to trigger the multivibrator in the usual fashion.

The output of the multivibrator is delivered from the anode of pentode 118 through condenser 146 and a resistance network including the resistance 148 to the grid of triode 150. A resistance 151 connects the anode of triode 150 to the positive supply voltage and the anode is connected to the grid of triode 150 through the condenser 152, the arrangement being such that the circuit of this triode constitutes an integrator which provides a triangular output with the amplitude of its excursions dependent upon the time of duration of the respective stable states of the multivibrator.

The operation of the described system is as follows:

The predetermined waveform A may be either drawn to a desired scale on the sheet 70 or more accurately may be plotted thereon while the plotter observes the readings of voltmeters 98 and 100 to determine the position of the stylus 72 corresponding to the ordinates and abscissae of points on the waveform which may be known. If a point by point plotting is thus effected by reference to the voltmeters there may follow this the drawing of a smooth curve, if the waveform is desirably smooth, or of broken lines, or the like, if otherwise, between the plotted points. In any event by the use of accurate voltmeters it will be evident that the curve may be provided on the sheet 70 so as to eliminate any errors of linearity of the potentiometers 92 and 96.

Following the production of the desired curve, the switches 42 and 52 are located in their left-hand positions illustrated in Figure 1. If now the operator follows the curve A by the stylus 72, the focused beam from the gun 10 will trace on the target 4 a curve corresponding to the curve A. The curve thus recorded will be maintained on the target in the usual fashion through the action of the beam from the holding gun 8.

The waveform may now be reproduced by the apparatus. Assuming that a direct reproduction of the precise waveform originally drawn is to be effected, the switch 56 is located in its right-hand position illustrated in Figure 1 to be connected to the linear horizontal sweep generator 64. The switches 42 and 52 are also located in their right-hand positions. The switch 32 is located in its upper position indicated in Figure 1.

Operation of the apparatus then occurs in the following fashion:

An initial impulse may be imparted to the reading beam from the gun 10 to cause it to move vertically so that its focused spot will move vertically on the target 4. The proper potential is, of course, at this time applied to provide a reading action by the beam from the gun 10 as contrasted with the writing action previously effected by the same gun. As the spot crosses the trace recorded on the target 4 an impulse will be transmitted through the video amplifier 22 to the error control 26. Assuming that the number of stages in the video amplifier is such that the crossing of the recorded trace by the beam gives rise to a negative trigger pulse at the input to the scaling circuit, the scaling circuit will be thrown to its alternative stable position producing a square wave output which, through the integrator, will produce an excursion of the beam projected on the target in an opposite direction. As the focused spot of this beam again crosses the recorded trace, the scaling circuit will again be flipped causing, through the integrator, a reversal of movement of the beam. As these excursions in reverse directions occur, with reversal after each passage of the beam across the recorded trace, the horizontal sweep will be moving the reading beam horizontally. The result is that the spot of focus of the reading beam will follow the recorded trace, zig-zagging across the trace at a high frequency. The circuit adjustments should be so set that this frequency of reversal is substantially greater than the highest frequency which it is desired to reproduce, and preferably constants are so chosen that the focused spot departs very little from the recorded trace above and below the same; i. e., the amplitude of the zig-zag wave should be small in the interest of maximum accuracy of reproduction. The potentials applied for vertical deflection are transmitted through the filter 106 which will cut off the frequency of the triangular zig-zag wave so that there will be reproduced at terminal 108 a smooth output corresponding to the original trace A. As will be evident by adjustment of the frequency of the horizontal sweep, the repetitive frequency of this output may be adjusted to any desired value short of the situation in which high frequency components of the original wave would be lost by their rise beyond the cut-off point of filter 106.

It will be evident that if the recorder trace on the target 4 is made as aforementioned, the output will correspond very precisely to the original traced curve A entirely independently of the aberrations and non-linearities of the oscilloscope tube, or of the amplifiers. There may, of course, be some deviations introduced by reason of the fact that the beam from gun 10 is operated at different potential gradients during the writing and reading operations, but, in general, the output will be closely linearly related to the input. This result follows from the fact that the same gun 10 is used for both recording and reproduction.

In addition to the circuitry above described, there are generally required for proper operation two auxiliary circuits, the first to insure continued operation if the crossing of the recorded trace by the beam fails to reverse its vertical direction, and the other to provide recovery to initial conditions during the flyback period of the horizontal sweep.

The former comprises the upper and lower bound comparators 154 and 156 receiving the vertical deflection potential from the amplifier 46 and delivering triggering pulses through connection 158 to the input of the amplifier 22. These two comparators are provided with upper and lower bound reference voltages, respectively, and may be of conventional types such as described in sections 9.10 to 9.16 of "Waveforms," Radiation Laboratory Series, volume 19. The two reference levels are adjusted above and below the working range of the vertical deflection plate potential. If, at any time, the multivibrator fails to trigger and the vertical beam deflection potential reaches either of these reference potentials, the corresponding comparator will generate a trigger which is applied to the multivibrator and reverses its state. While this action will produce a sharp isolated peak, this peak will be of no consequence since it will be effectively removed by the filter 106.

To provide restoration to initial conditions during the flyback period of the horizontal sweep there is provided a restoring switch 160 controlled at the time of flyback through connection 162 from the horizontal sweep generator. This restoring switch may be of conventional double diode type which will be operative during the horizontal sweep flyback period to return the output of the integrator to original condition at the beginning of the sweep. In other words, the focused point of the reading beam will be brought to an initial position and irrespective of whether, at that time, it will be moving toward or away from the recorded trace, the comparators previously mentioned will effect such movement, if necessary, as will insure continued operation.

Figure 3:
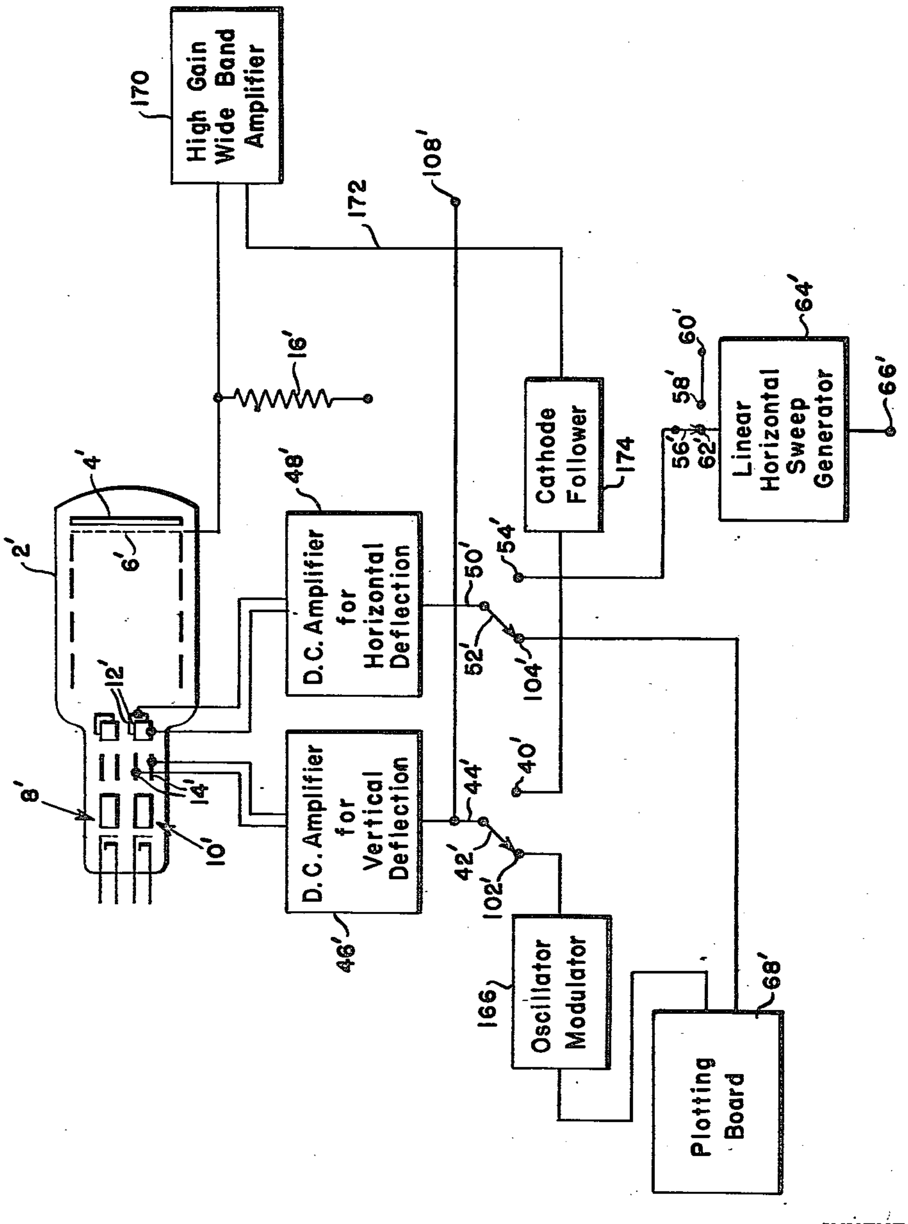
Figure 3 is a diagram similar to Figure 1 but illustrating another type of function generator.

An alternative type of apparatus which may be used for carrying out the invention is illustrated in Figure 3. If this figure is compared with Figure 1, it will be noted that it contains many similar elements which are designated by the same numerals as in Figure 1 primed. Since these elements are the same and perform similar functions, they need not be again described.

In the apparatus of Figure 1 there was recorded on the target 4 a curve representing the function which was to be reproduced. In contrast, in the case of the apparatus of Figure 3, there is provided on the target 4' a charged area having as its upper bound the curve of the function to be reproduced. To provide such an area during the writing operation, the vertical potential output from the plotting board 68' is used to modulate an oscillator 166 which in turn delivers its output through the contact point 102' and switch 42' to the vertical deflection amplifier 46'. This oscillator and modulator arrangement may be of conventional type but is desirably such that oscillations are limited in amplitude by the potential fed to 166 from the plotting board. It will be evident that such an arrangement will provide a charged area on target 4' the upper bound of which will be a curve corresponding to that plotted.

Having produced such a charged area, it may be read out of the apparatus by placing switches 42' and 52' in contact with 40' and 54'. The high gain wide band amplifier 170 receiving the signal from the collector screen 6' delivers its output through connection 172 to a cathode follower at 174 which is connected to the contact point 40'. The operation of the apparatus of Figure 3 in reading out a signal is as follows:

Assume that the focused spot of the beam from gun 10' falls within the charged area and assume that this area is below the curve representative of the function (though, of course, it may be above the same). When the focused spot is within the charged area, it will produce a collector current of one value which will be greater than if it was in an uncharged area of the target 4'. The amplifier arrangement and adjustments are so made that if the input to amplifier 170 corresponds to the collector current representative of the charged area, the signal delivered from the amplifier will cause the spot to move upwardly until it reaches the boundary of the charged area, whereupon the spot will assume a position such that, straddling the boundary, it will provide an equilibrium condition, the collector screen current being such as to position the spot to achieve this condition. The result, unlike the zigzag motion of the spot in the apparatus of Figure 1, will be a substantially smooth following of the boundary under the action of the horizontal sweep, the spot continuously straddling the boundary unless there are unwanted transients or unless the system oscillates due to too high an amplifier gain or insufficient stability. When properly operating, no filter corresponding to 106 will be required. Furthermore no restoring switch is required though there is desirably provided a blanking signal during flyback, this being in accordance with conventional television practice. As in the case of the modification of Figure 1, it will be evident that there may be provided input from a source other than a plotting board and that the horizontal sweep may be defined by some other potential than that produced by a linear sweep generator.

Figure 4:
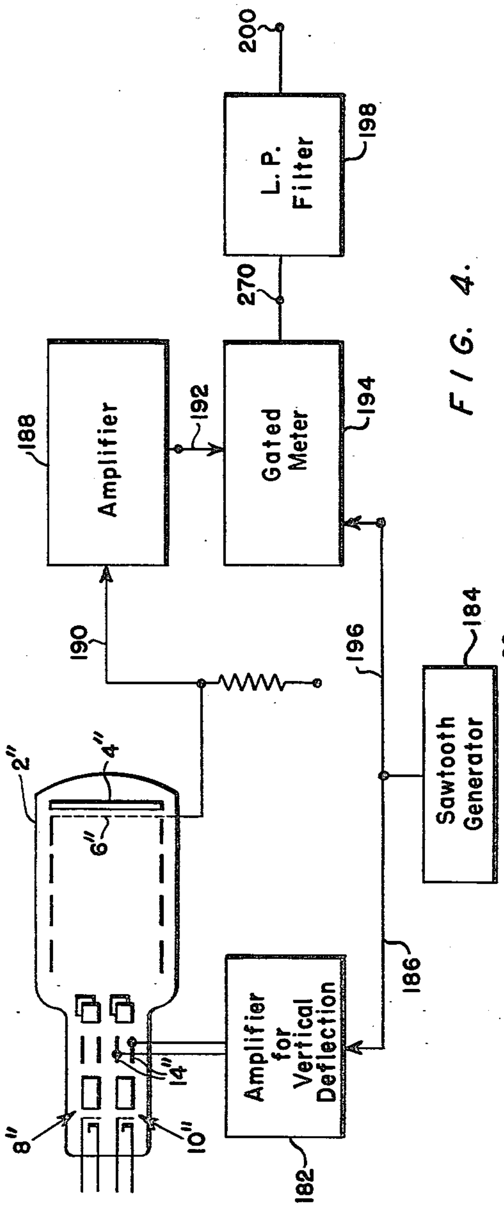
Figure 4 is another diagram similar to Figure 1 showing still another type of function generator.

Figure 4 illustrates still another modification of the invention. Inasmuch as in this modification the recording operation is similar to that involved in Figure 3 and the record made on the target 4'' is the same as in the modification of Figure 3, Figure 4 illustrates only the portions of the circuit having to do with the reading out of the recorded function, it being understood that switching devices similar to those in Figure 3 would be provided to effect such connections as are necessary to make the record.

The various parts of the memory tube are designated by the same numerals as in Figure 1 but double primed. A vertical deflection amplifier 182 is connected to the vertical deflecting plates 14″ and through a connection 186 receives an input from a high frequency sawtooth generator 184 providing at the deflecting plates 14″ a sufficient signal to cause the focused beam to sweep across the boundary of the charged area on the target 4″. The precise waveform of the generator is relatively unimportant and, in fact, the generator may, if desired, provide a sinusoidal wave.

The output from the collector screen 6″ is fed at 190 to an amplifier 188 the output from which is delivered through 192 to provide a gating signal for a unit 194 which as hereafter appears may be aptly called a gated meter, which is provided with an input from the generator 184 through connection 196. The output from the gated meter 194 is fed through a low pass filter 198 to the output terminal 200. The various parts, with the exception of the gated meter, are conventional in form.

Figure 5:
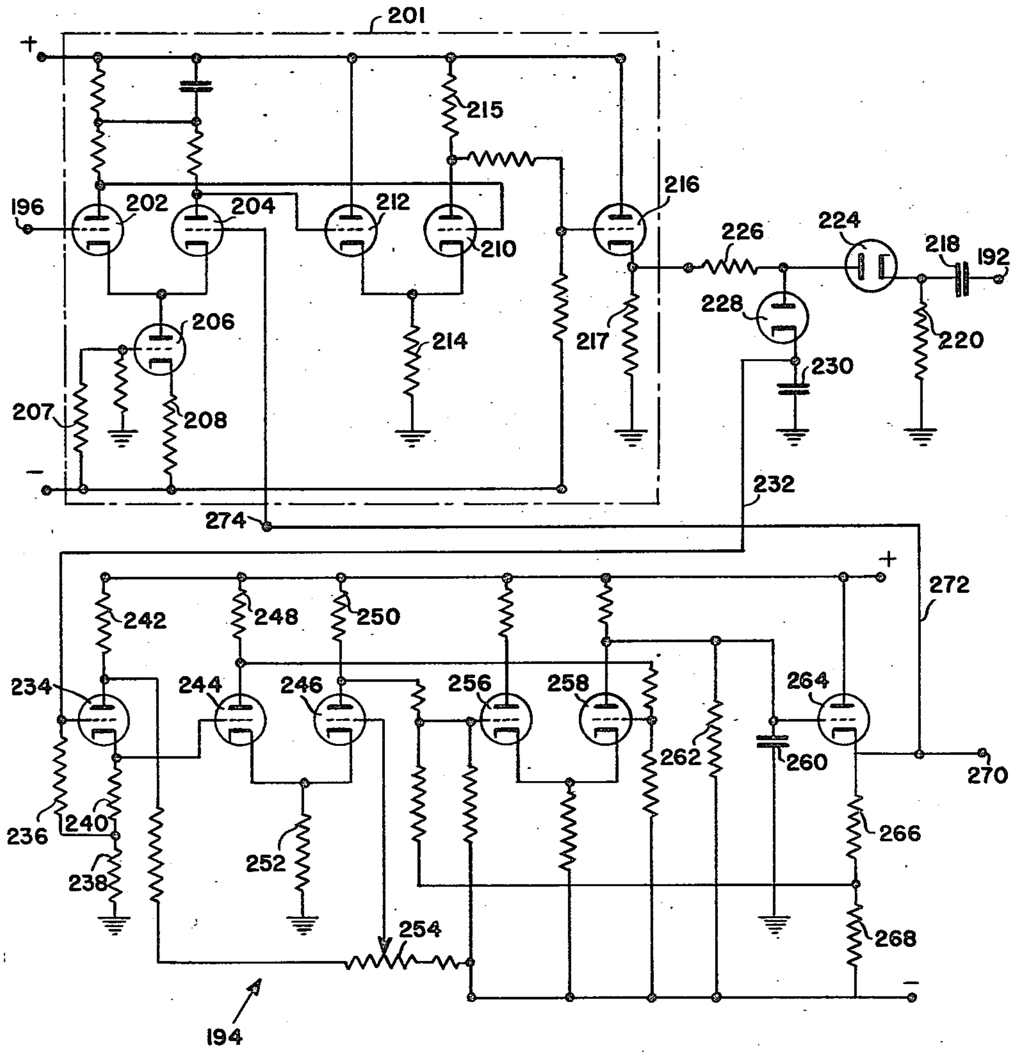
Figure 5 is a wiring diagram of a preferred form of the gated meter indicated in Figure 4.

The gated meter 194 is detailed in Figure 5 and is claimed in the application of Omar L. Patterson, Serial Number 316,174, filed October 22, 1952, filed as a continuation-in-part of an application, Serial Number 239,279, filed July 30, 1951, in which said meter was disclosed. The portion 201 of this meter consists of a high gain differential amplifier which comprises the triodes 202 and 204, the grid of the former being connected to the line 196 from the sawtooth generator. A constant current triode arrangement is provided by the triode 206 having a cathode load resistor 208, the grid of the triode having applied thereto a fixed negative potential by connection to a resistor arrangement 207 connected between a negative supply line and ground. This arrangement is such, by reason of its connection to the cathodes of triodes 202 and 204, to provide a substantially constant current flow between the cathodes of the triodes and the negative potential supply line. While the current may thus not be maintained as constant as by the use of a battery, there is a sufficient degree of constancy obtained to eliminate substantially the common mode for the purposes of the gated meter involved in this circuit. The anodes of triodes 202 and 204 are provided with suitable load networks as shown and are connected, respectively, to the grids of triodes 210 and 212, the cathodes of which are connected together and to ground through a common cathode load resistor 214. A signal taken from the junction of the anode of triode 210 and its load resistor 215 is delivered to the grid of the triode 216 which is in a cathode follower arrangement with a cathode load resistor 217. A positive gating pulse is introduced into the gated meter at 192 from the amplifier 188 through condenser 218 to the cathode of the diode 224, the cathode being connected to ground through a resistor 220 of relatively low resistance value. The anode of diode 224 is connected to the cathode of triode 216 through a resistor 226 and is connected to the anode of a diode 228 the cathode of which is connected to ground through a condenser 230. Connection 232 runs from the ungrounded side of condenser 230 to the grid of a triode 234, the grid of this triode being connected through resistor 236 to the junction of a pair of resistors 238 and 240 connected between the cathode of triode 234 and ground. This triode is provided with an anode load resistor 242. A high gain amplifier arrangement is provided by triodes 244, 246, 256 and 258. The anodes of triodes 244 and 246 are connected through anode resistors 248 and 250 to the positive supply line. Their cathodes are connected together and to the ungrounded end of a resistor 252. Signals from the anodes of triodes

244 and 246 are delivered to the grids of the triodes 256 and 258. From the anode of the latter, the signals are delivered to the condenser 260, one side of which is grounded. Between the ungrounded side of condenser 260 and the negative potential supply line there is a resistor 262. The ungrounded side of condenser 260 is connected to the grid of triode 264 in a cathode follower circuit, there being provided the cathode resistors 266 and 268 in series. The cathode of triode 264 is connected to the output terminal 270 and through line 272 to the terminal 274 which is connected to the grid of triode 204.

The operation of the gated meter will be apparent from the following:

Assume first a particular potential at terminal 274 corresponding to the potential of the cathode of triode 264 which potential will be approximately that of the condenser 260. If, now, a waveform is applied at terminal 196 (the sawtooth wave from generator 184, for example), a greatly magnified signal representative of the difference of potential between line 196 and terminal 274 will be produced at the grid of triode 216, the magnitude of this signal increasing as the magnitude of the signal at 196 increases. During the period of absence of a positive pulse at the terminal 192, the diode 224 will be conducting and the output from the cathode of triode 216 will be effectively grounded through load resistance 220. When, however, a positive gating pulse of sufficient magnitude occurs at terminal 192, the magnitude being higher than the highest potential which may be expected to appear at the grid of triode 216, the diode 224 will become nonconductive and, consequently, current will flow through diode 228 to provide charging of the condenser 230. The condenser 230 and the associated resistance arrangement at 236 and 238 provides a sufficient integrating action to prevent substantial discharge of the condenser during the interval between repetitive cycles of the input wave form.

Direct amplification of the potential of condenser 230 occurs through the amplifier arrangement involving triodes 234, 244, 246, 256 and 258 providing an amplified charging of condenser 260 which is also associated with a resistor 262 so as to provide an integrating action serving to maintain the condenser 260 against substantial discharge through the duration of a single period of the input wave being sampled. A potential corresponding to that of condenser 260, which may be regarded as only slowly varying over the duration of a cycle, is applied through connection 272 to the grid of triode 204. The result is that, through a period of very few successive cycles, the potential of the grid of triode 204 will become adjusted to substantial equality with the potential appearing at the input 196 at the interval of duration of the gating pulse. It will be noted that if the potential of the grid of triode 204 is less than that at 196 at the time of gating the circuit arrangement is such as to raise the potential of the grid of triode 204 toward that of 196. If, however, the potential of the grid of triode 204 is greater than that of the input at 196 at the time of sampling, a reverse action occurs by condenser discharge. Due to the extremely high gain of the differential amplifier and the additional high gain of the direct amplifier, the difference between the potential of the grid of triode 204 and that appearing at the input terminal 196 at the time of gating is made very small with the ultimate result that, at the output terminal 270, there will appear to a very high degree of accuracy the potential of the input wave form at the instant of sampling.

As applied to Figure 4 the gated meter 194 has an action as follows:

The input signal at 196 is from the sawtooth or other generator and this same signal produces vertical deflection of the beam in the memory tube. When the beam from the gun 10″ passes from the charged to the uncharged area of the target 4″, a signal will be emitted from the collector screen 6″ which will be amplified and will produce a gating signal at 192. Desirably, of course, this signal is sharpened by differentiation so as to have a very short interval compared to the period of the sawtooth wave. The gated meter has its time constants so arranged as to hold the potential at the instant of gating only for a period of substantially one cycle of the sawtooth generator. Under these conditions it will be evident that the gated meter will provide a signal which is equal to the potential of the vertical deflecting plates at the instant of crossing of the charged boundary by the beam spot, the signal including high frequency components which will be removed by the low pass filter 198. While in this case the spot is not caused to travel along a curve corresponding to the recorded potential, nevertheless if the parts are substantially linearly related, the output signals will be linearly proportional to the input signals which produced the record and independent of aberrations or non-linearities in the memory tube.

It may be here noted that the gated meter which has been described is particularly desirable in this circuit since its operation is largely independent of the pulse width of the gating pulse as well as power supply fluctuation and drift. This is important in the application here involved since the pulse width during gating is dependent upon the slope of the recorded curve provided by the boundary of the charged area of the memory tube.

There has been described above the making of a record through control of vertical and horizontal potentials by the operation of the stylus 72. However, it is also possible to make a record of an external voltage applied to the terminal 36 if the switch 32 is in its lower position engaging contact point 34 with the switches 42 and 52 in their right-hand positions. The external voltage wave may be thus recorded whether it is of transient form or repeated form.

The terminal 60 provides for the introduction of a horizontal sweep voltage which may not be linear but may, for example, be sinusoidal or of any other form. Assuming that a record is made through the use of a plotting board by following a wave shape such as A with the stylus, the reproduction which is effected by feeding another waveform to the terminal 60 will involve the production of an output which is one function of a second function of time, the form of the first function being that of the curve A, while the form of the second function just mentioned will be that of the sweep function applied to the terminal 60. It will be evident that in this fashion the apparatus may be operated as a computer to give rise to quite elaborate derived functions.

The terminal 60 has another use. After the recording of a function in the memory tube in any of the fashions previously described, and with switches 42 and 52 in their right hand positions, with switch 56 on contact 58, and with switch 32 in its upper position, there may be applied to terminal 60 a fixed, adjustable or varying potential to terminal 60. In such case, the output at terminal 108 will be the recorded function of any instantaneous value of potential at terminal 60. Sweep in the conventional sense is then not involved. If, for example, the potential at 60 is fixed at some adjusted value or variable in accordance with the output of some additional circuit, the recorded function of this potential will be reproduced. Thus the circuit is effectively a tabulation, with interpolation, of any desired recorded function from which a function value corresponding to an arbitrary argument will be automatically delivered. As will be evident the same result may be secured using terminal 60' of Figure 3.

It will be evident that the systems of the type described are particularly adaptable for use singly or multiply in differential analyzers or other computers and in particular in analogs in which functions of an experimentally determined nature must be introduced. As is well known in the art functions appearing as electrical potentials or currents varying with time may be subject to algebraic and other processes such as differentiation and integration and may be combined with other functions in numerous fashions. It will be evident that the types of apparatus described are particularly susceptible to such uses. The foregoing is particularly true when the computing apparatus is of a cyclical type performing its operations repeatedly in successive cycles, which may be relatively short in duration in view of the high speed of response of the types of systems described. As examples of applications of the present function generators there may be cited the computers of the types described in the applications of Omar L. Patterson, Serial Numbers 130,270 (now Patent No. 2,727,682), 196,480, and 239,279, filed respectively November 30, 1949, November 18, 1950, and July 30, 1951.

It will be evident that, while the foregoing descriptions relate to the recording and reproduction of a curve in rectangular Cartesian coordinates, the invention is applicable to the recording and reproduction of a curve in polar or other orthogonal or even non-orthogonal coordinates. In the case of use of polar coordinates each sweep may consist of 360° of continuous rotation of the beam or of some integral fraction thereof.

It will be evident from the foregoing that numerous variations may be made in the embodiments of the invention without departing from the scope thereof as defined in the following claims.

What is claimed is:

1. In combination, a memory tube of the type including a read-write electron gun and a target for the retention of a charge pattern produced by said gun, means for imparting coordinate movements to an electron beam from said gun to provide a pattern on said target characterized by presentation of a curve of predetermined form in coordinates corresponding to said movements of the beam, and means for reproducing from said pattern a function, the last mentioned means including devices for producing sweeps of a beam from said gun in the direction of one of said coordinate movements, devices for producing a large number of crossings of said curve by the last mentioned beam in the direction of the other of said coordinate movements, and devices providing an output in the form of a smoothed function of the sweep deviations of said beam corresponding in amplitude substantially to the deviations of the beam at the times of the individual crossings of said curve.

2. In combination, a memory tube of the type including a read-write electron gun and a target for the retention of a charge pattern produced by said gun, means for imparting substantially rectangular coordinate movements to an electron beam from said gun to provide a pattern on said target characterized by presentation of a curve of predetermined form in coordinates corresponding to said movements of the beam, and means for reproducing from said pattern a function, the last mentioned means including devices for producing sweeps of a beam from said gun in the direction of one of said coordinate movements, devices for producing a large number of crossings of said curve by the last mentioned beam in the direction of the other of said coordinate movements, and devices providing an output in the form of a smoothed function of the sweep deviations of said beam corresponding in amplitude substantially to the deviations of the beam at the times of the individual crossings of said curve.

3. In combination, a memory tube of the type including a read-write electron gun and a target for the retention of a charge pattern produced by said gun, means for imparting coordinate movements to an electron beam from said gun to provide on said target a curve of predetermined form in coordinates corresponding to said movements of the beam, and means for reproducing from said curve a function, the last mentioned means including devices for producing sweeps of a beam from said gun in the direction of one of said coordinate movements, devices for producing a large number of crossings of said curve by the last mentioned beam in the direction of the other of said coordinate movements, and devices providing an output in the form of a smoothed function of the sweep deviations of said beam corresponding in amplitude substantially to the deviations of the beam at the times of the individual crossings of said curve.

4. In combination, a memory tube of the type including a read-write electron gun and a target for the retention of a charge pattern produced by said gun, means for imparting substantially rectangular coordinate movements to an electron beam from said gun to provide on said target a curve of predetermined form in coordinates corresponding to said movements of the beam, and means for reproducing from said curve a function, the last mentioned means including devices for producing sweeps of a beam from said gun in the direction of one of said coordinate movements, devices for producing a large number of crossings of said curve by the last mentioned beam in the direction of the other of said coordinate movements, and devices providing an output in the form of a smoothed function of the sweep deviations of said beam corresponding in amplitude substantially to the deviations of the beam at the times of the individual crossings of said curve.

5. In combination, a memory tube of the type including a read-write electron gun and a target for the retention of a charge pattern produced by said gun, means for imparting coordinate movements to an electron beam from said gun to provide a pattern on said target characterized by presentation of a curve of predetermined form in coordinates corresponding to said movements of the beam, and means for reproducing from said pattern a function, the last mentioned means including devices for producing sweeps of a beam from said gun in the direction of one of said coordinate movements, devices for producing a large number of small amplitude zig-zag crossings of said curve by the last mentioned beam in the direction of the other of said coordinate movements, and devices providing an output in the form of a smoothed function of the sweep deviations of said beam corresponding in amplitude substantially to the deviations of the beam at the times of the individual crossings of said curve.

6. In combination, a memory tube of the type including a read-write electron gun and a target for the retention of a charge pattern produced by said gun, means for imparting substantially rectangular coordinate movements to an electron beam from said gun to provide a pattern on said target characterized by presentation of a curve of predetermined form in coordinates corresponding to said movements of the beam, and means for reproducing from said pattern a function, the last mentioned means including devices for producing sweeps of a beam from said gun in the direction of one of said coordinate movements, devices for producing a large number of small amplitude zig-zag crossings of said curve by the last mentioned beam in the direction of the other of said coordinate movements, and devices providing an output in the form of a smoothed function of the sweep deviations of said beam corresponding in amplitude substantially to the deviations of the beam at the times of the individual crossings of said curve.

7. In combination, a memory tube of the type including a read-write electron gun and a target for the retention of a charge pattern produced by said gun, means for imparting coordinate movements to an electron beam from said gun to provide on said target a curve of predetermined form in coordinates corresponding to said movements of the beam, and means for reproducing from said curve a function, the last mentioned means including devices for producing sweeps of a beam from said gun in the direction of one of said coordinate movements, devices for producing a large number of small amplitude zig-zag crossings of said curve by the last mentioned beam in the direction of the other of said coordinate movements, and devices providing an output in the form of a smoothed function of the sweep deviations of said beam corresponding in amplitude substantially to the deviations of the beam at the times of the individual crossings of said curve.

8. In combination, a memory tube of the type including a read-write electron gun and a target for the retention of a charge pattern produced by said gun, means for imparting substantially rectangular coordinate movements to an electron beam from said gun to provide on said target a curve of predetermined form in coordinates corresponding to said movements of the beam, and means for reproducing from said curve a function, the last mentioned means including devices for producing sweeps of a beam from said gun in the direction of one of said coordinate movements, devices for producing a large number of small amplitude zig-zag crossings of said curve by the last mentioned beam in the direction of the other of said coordinate movements, and devices providing an output in the form of a smoothed function of the sweep deviations of said beam corresponding in amplitude substantially to the deviations of the beam at the times of the individual crossings of said curve.

9. In combination, a memory tube of the type including a read-write electron gun and a target for the retention of a charge pattern produced by said gun, means for imparting coordinate movements to an electron beam from said gun to povide a pattern on said target characterized by presentation of a curve of predetermined form in coordinates corresponding to movements of the beam, and means for reproducing from said pattern a function, the last mentioned means including devices for producing movement of a beam from said gun in the direction of one of said coordinate movements, devices for producing movement of the last mentioned beam in the direction of the other of said coordinate movements, and devices providing an output corresponding in amplitude substantially to deviations of the beam under the action of the last mentioned devices when coinciding with said curve presented by the target pattern.

10. In combination, a memory tube of the type including a read-write electron gun and a target for the retention of a charge pattern produced by said gun, means for imparting coordinate movements to an electron beam from said gun to provide a pattern on said target characterized by presentation of a curve of predetermined form in coordinates corresponding to movements of the beam, and means for reproducing from said pattern a function, the last mentioned means including devices for producing sweeps of a beam from said gun in the direction of one of said coordinate movements, devices for producing movement of the last mentioned beam in the direction of the other of said coordinate movements, and devices providing an output in the form of a smooth function of the sweep deviations of said beam corresponding in amplitude substantially to deviations of the beam under the action of the last mentioned devices when coinciding with said curve presented by the target pattern.

11. In combination, a memory tube of the type including a read-write electron gun and a target for the retention of a charge pattern produced by said gun, means for imparting substantially rectangular coordinate movements to an electron beam from said gun to provide a pattern on said target characterized by presentation of a curve of predetermined form in coordinates corresponding to movements of the beam, and means for reproducing from said pattern a function, the last mentioned means including devices for producing movement of a beam from said gun in the direction of one of said coordinate movements, devices for producing movement of the last mentioned beam in the direction of the other of said coordinate movements, and devices providing an output corresponding in amplitude substantially to deviations of the beam under the action of the last mentioned devices when coinciding with said curve presented by the target pattern.

12. In combination, a memory tube of the type including a read-write electron gun and a target for the retention of a charge pattern produced by said gun, means for imparting substantially rectangular coordinate movements to an electron beam from said gun to provide a pattern on said target characterized by presentation of a curve of predetermined form in coordinates corresponding to movements of the beam, and means for reproducing from said pattern a function, the last mentioned means including devices for producing sweeps of a beam from said gun in the direction of one of said coordinate movements, devices for producing movement of the last mentioned beam in the direction of the other of said coordinate movements, and devices providing an output in the form of a smooth function of the sweep deviations of said beam corresponding in amplitude substantially to deviations of the beam under the action of the last mentioned devices when coinciding with said curve presented by the target pattern.

13. In combination, a memory tube of the type including a read-write electron gun and a target for the retention of a charge pattern produced by said gun, means for imparting coordinate movements to an electron beam from said gun to provide on said target a curve of predetermined form in coordinates corresponding to movements of the beam, and means for reproducing from said pattern a function, the last mentioned means including devices for producing movement of a beam from said gun in the direction of one of said coordinate movements, devices for producing movement of the last mentioned beam in the direction of the other of said coordinate movements, and devices providing an output corresponding in amplitude substantially to deviations of the beam under the action of the last mentioned devices when coinciding with said curve presented by the target pattern.

14. In combination, a memory tube of the type including a read-write electron gun and a target for the retention of a charge pattern produced by said gun, means for imparting coordinate movements to an electron beam from said gun to provide on said target a curve of predetermined form in coordinates corresponding to movements of the beam, and means for reproducing from said pattern a function, the last mentioned means including devices for producing sweeps of a beam from said gun in the direction of one of said coordinate movements, devices for producing movement of the last mentioned beam in the direction of the other of said coordinate movements, and devices providing an output in the form of a smooth function of the sweep deviations of said beam corresponding in amplitude substantially to deviations of the beam under the action of the last mentioned devices when coinciding with said curve presented by the target pattern.

References Cited in the file of this patent

UNITED STATES PATENTS

| | | |
|---|---|---|
| 2,275,026 | Bedford | Mar. 3, 1942 |
| 2,297,752 | Du Mont et al. | Oct. 6, 1942 |
| 2,412,467 | Morton | Dec. 10, 1946 |
| 2,437,173 | Rutherford | Mar. 2, 1948 |
| 2,451,005 | Weimer et al. | Oct. 12, 1948 |
| 2,461,667 | Sunstein | Feb. 15, 1949 |
| 2,463,535 | Hecht | Mar. 8, 1949 |
| 2,473,691 | Meacham | June 21, 1949 |
| 2,548,789 | Hergenrother | Apr. 10, 1951 |
| 2,597,683 | Stocker | May 20, 1952 |
| 2,617,963 | Arditi | Nov. 11, 1952 |
| 2,639,425 | Russell et al. | May 19, 1953 |